Figure 7:
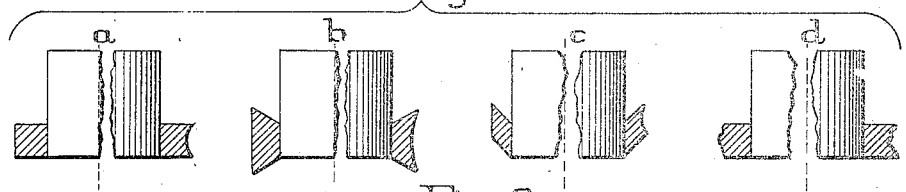

H. MUELLER, DEC'D.
O. B. & A. MUELLER, EXECUTORS.
PIPE COUPLING.
APPLICATION FILED SEPT. 10, 1908.
980,116.
Patented Dec. 27, 1910.
2 SHEETS—SHEET 1.
Fig.3.
Fig.5.
Fig.1.
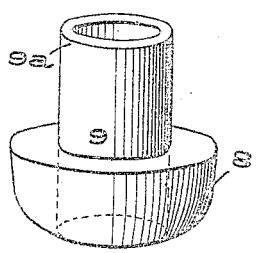
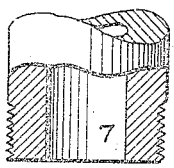
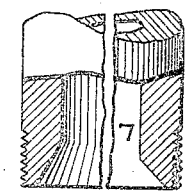
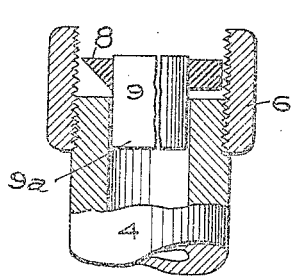
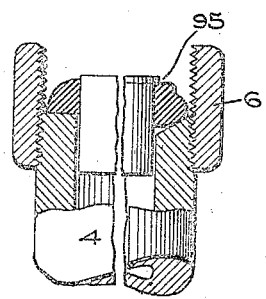
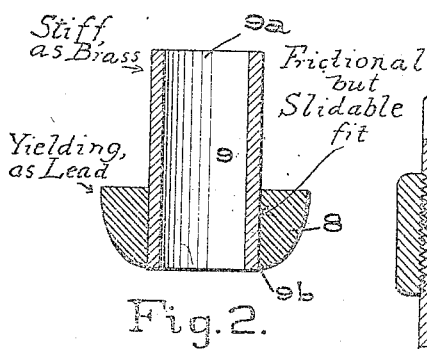
Stiff as Brass
Frictional but Slidable fit
Yielding, as Lead
Fig.2.
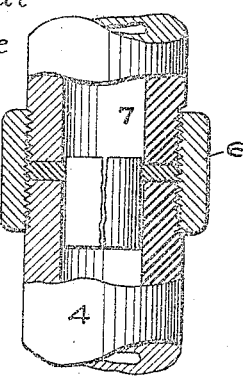
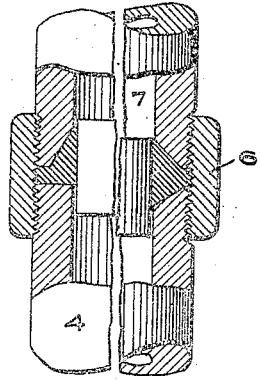
Fig.4.
Fig.6.
Witnesses.
Chester W. Hathaway
Virginia Hamilton
Inventor
Henry Mueller
by John L. Waddell
Attorney.

UNITED STATES PATENT OFFICE.

HENRY MUELLER, OF DECATUR, ILLINOIS; ORA B. MUELLER AND ADOLPH MUELLER, EXECUTORS OF SAID HENRY MUELLER, DECEASED, ASSIGNORS TO H. MUELLER MANUFACTURING COMPANY, OF DECATUR, ILLINOIS, A CORPORATION OF ILLINOIS.

PIPE-COUPLING.

980,116.   Specification of Letters Patent.   Patented Dec. 27, 1910.

Application filed September 10, 1908. Serial No. 452,448.

*To all whom it may concern:*

Be it known that I, HENRY MUELLER, a citizen of the United States, and a resident of Decatur, Macon county, State of Illinois, have invented certain new and useful Improvements in Pipe-Couplings; and my preferred manner of carrying out the invention is set forth in the following full, clear, and exact description, terminating with claims particularly specifying the novelty.

This invention relates to water distribution, and more especially to detachable pipe couplings; and its object is to produce a gasket for use between the extremities of pipe sections or members whose construction permits it to be manually inserted in one of them so as to leave the hands of the operator free, and whose parts are so shaped that in the approximation of the members the yielding portion of the gasket will be compressed longitudinally and distended outward if the extremities are cut off flat or will be compressed both longitudinally and inward if one or both of said members have bores which flare to their extremities. The result in any event is that said yielding portion in its final position will securely seal the juncture between said extremities and may even be distended outward to the coupling, while the employment of a thin sustaining ring extending through the bore of said yielding portion prevents its distortion inward which would restrict the capacity of said members. These objects are accomplished, broadly speaking, by the use of a joint-ring of yielding metal such as lead, having a cylindrical bore, and having an exterior of any shape which is suitable for the purpose but preferably conical or substantially so if one of the members has a flared extremity; associated with a sustaining ring of thin and stiff metal such as brass, substantially cylindrical throughout its length although it may be upset at one end if desired as explained below, extending from said end throughout the bore of the joint-ring which latter is fitted frictionally but slidably around it, and continued beyond the other end thereof into a tubular extension adapted to fit frictionally but slidably within the bore of one of said members so that it may be manually inserted therein and will retain the gasket in position while the hands of the operator are left free to make the connection. Several embodiments of this general idea are illustrated in the accompanying drawings whose first two views show the simplest and what might be called the preferred form of the gasket, whose next four views illustrate the manner of its use, and whose remaining views are diagrammatic and serve the purpose of illustrating modifications which will be explained herein.

Figure 8:
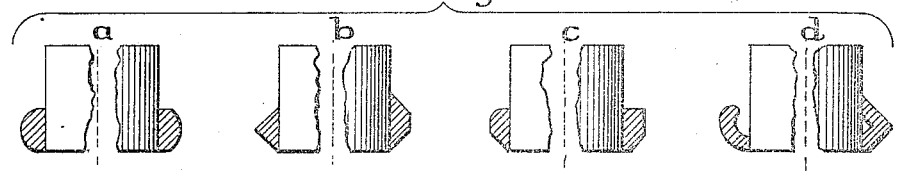
Figure 9:
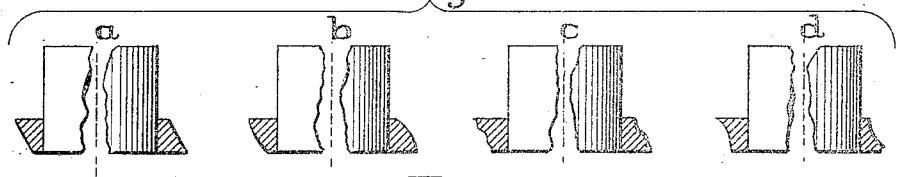
Figure 11:
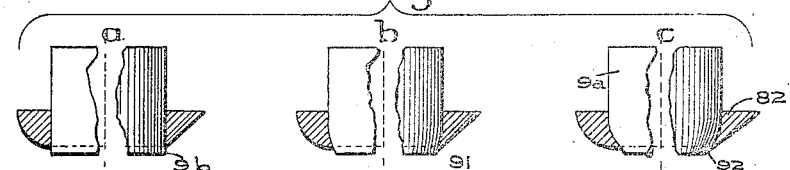
Figure 12:
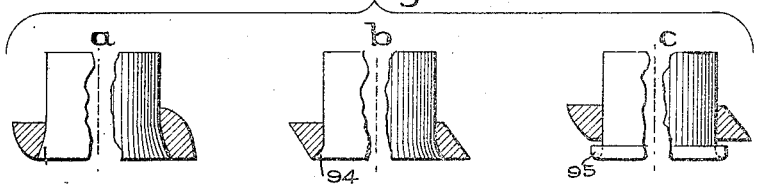

Referring specifically to the drawings— Figure 1 is a perspective view of the gasket complete, and Fig. 2 is a central longitudinal section thereof; Fig. 3 shows the two pipe sections or members slightly separated from each other and all parts as they appear immediately before the connection is made, and Fig. 4 shows the same with the parts in the position they occupy after the connection is made; in like manner Figs. 5 and 6 show members whose extremities are differently shaped, respectively before and after the connection is made, and in the four views just mentioned the parts at the left and at the right differ slightly for the purpose of amplifying the illustration without multiplying the number of figures in the drawings; Figs. bearing the numeral 7 show variations in the shape of joint-rings which all surround the sustaining ring at one end of the latter, Figs. 8 show joint-rings of larger diameter elsewhere than at the lower extremity of the gasket, Figs. 9 show truncated cones and Figs. 10 true cones—all those at the left being of smaller diameter at the extremity of the gasket than elsewhere and all those at the right inverted; Figs. 11 show the joint-ring as substantially flush with the lower end of the sustaining ring, and how the latter may be upset or contracted, and Figs. 12 show how the sustaining ring may be upset or distended outward.

Broadly speaking, the numerals 4 and 7 are used hereinafter to designate the members which are to be connected, 6 is the coupling, 8 is the soft joint-ring, and 9 the sustaining ring which together constitute the gasket; and these numerals with modifications are applied to like parts throughout all the figures of the drawings.

Specifically, the gasket as best seen in its simplest form in Figs. 1 and 2, comprises a sustaining ring or short piece of tubing 9, preferably of brass or some other stiff and thin metal which will withstand inward pressure and whose bore is of a size that will not materially restrict the passage through the members to be connected; and around one end of said sustaining ring for about half of its length is frictionally but slidably fitted the cylindrical bore of a yielding joint-ring 8, preferably of lead or some other yielding and ductile metal not elastic like rubber or similar material. I consider it important to the present invention for the reasons explained below that in the manufacture of this gasket the joint-ring be pressed or otherwise formed into shape around the sustaining ring in such manner that it will be held thereon with sufficient friction to prevent its dislodgment or displacement under ordinary handling, but yet sufficiently loose to permit it to slide upon the sustaining ring under pressure, and I consider it also important that the material of the joint-ring be "yielding" as described rather than flexible or elastic. As shown in these views, the exterior of the joint-ring is struck nearly on a quarter circle so that as a whole it is substantially conical, but this shape is not necessary and modifications thereof are explained below. As also shown in these views, the joint-ring is fitted upon the sustaining ring with the smaller end of the former substantially flush with one end of the latter although it might project a trifle as shown at 9ᵇ, whereas the other or larger end of the joint-ring is remote from the other end of the sustaining ring so that the latter forms an extension 9ᵃ which is truly cylindrical on its exterior and is adapted to fit into the bore of one of the members 4 or 7 as shown in Figs. 3 and 5. I do not limit myself to the exact sizes, shapes, proportions, materials, or construction of these parts of the gasket, however, as the following specification and the diagrammatic views in the drawings will show that it is susceptible of much variation in details without departing from the spirit of the present invention.

Figs. 3 to 6 show the use of a gasket constructed substantially in accordance with the description just given—the members 7 and 4 in Figs. 3 and 4 being cut off flat at their extremities, and in Figs. 5 and 6 the member 7 being flared and the member 4 flat at the left and both having flared extremities at the right. Figs. 3 and 5 also show joint-rings of four different cross sections, and the shape of parts before the connection is made; while Figs. 4 and 6 show the shape of parts after the connection is made, the couplings 6 at the right of these views being screwed up more tightly than at the left. Figs 4 and 6 also show at the left how the sustaining ring may be pushed slightly into the bore of the member 7 when the connection is made, and at the right how the corner or angle of said bore may push the sustaining ring in the other direction and farther into the member 4 as the connection is made. In Figs. 3 and 4 where the ends are cut off flat the approximation of the members obviously compresses the joint-ring longitudinally and eventually distends it outward to or nearly to the coupling; in Figs. 5 and 6 the flaring end of one member or ends of both obviously compress the joint-ring longitudinally and also diametrically inward, with perhaps a little distention outward toward the coupling; and in all these views the presence of the stiff sustaining ring extending through the bore of the joint-ring, whatever the shape of the latter, resists its expansion radially inward toward the axis which would obviously restrict the capacity of the bore of this gasket.

In making a connection, the gasket is put in place by manually inserting the extension 9ᵃ into the bore of one of the members, wherein it is held by friction which is preferably about the same as the frictional fit of the joint-ring upon it. The drawings show this extension as initially inserted into the lowermost member in Figs. 3 and 5, but that is not always necessary as the friction should be such as to hold it if inserted in the uppermost of two members which are to be connected. It will be seen that a gasket of this construction increases the facility of manipulation, is adapted for use with members having bores of different size so long as the extension 9ᵃ will frictionally fit one of them, will work successfully whether their extremities are flat or flared or both, and may be employed with couplings of a variety of shapes. It is important to note, also, that while the joint-ring has been described as preferably conical or tapered, such shape is not at all necessary when the extremities of the coupling members are flat and may even be modified considerably when one or both are flared, because it is the presence of the sustaining ring and the approximation of the extremities which produce the compression of the joint-ring and its distention so that in its final position it substantially fills the space where leakage might occur. It is important in the present instance to note, also, that the joint-ring shall fit frictionally and slidably (but not tightly) around the sustaining ring so that if the latter be pushed along in place as the connection is made it will slip through the joint-ring as shown at the right of Fig. 6, and so that in any event when the approximation of members compresses the joint-ring longitudinally it will slip in probably both directions along upon the sustaining ring without being distorted out of shape by clinging thereto, and will eventually be distended outward since it cannot be distended radially inward.

In Figs. 7 are shown various sections of the joint-ring whose generic principle is that they all stand at or approximately at one end of the supporting ring. The views all show the radial outer edge of the joint-ring dished at the right and cut off substantially flat at the left, 7ª being square, 7ᵇ dove-tailed, 7ᶜ diamond shaped, and 7ᵈ irregular.

In Figs. 8 are shown various sections wherein the diameter of the joint-ring is larger elsewhere than at that extremity which is flush with the sustaining ring, the views at the right having some flat sides or ends, and 8ª showing the outer side rounded, 8ᵇ angular, 8ᶜ rounded and beveled off at its extremity, and 8ᵈ arc-shaped.

In Figs. 9 are shown truncated-cones, those at the right having their larger ends and those at the left their smaller ends adjacent the extremity of the sustaining ring, 9ª showing a plain truncated cone, 9ᵇ showing one with a curved outer face, 9ᶜ with an irregular outer face, and 9ᵈ with a dished outer face.

Figure 10:
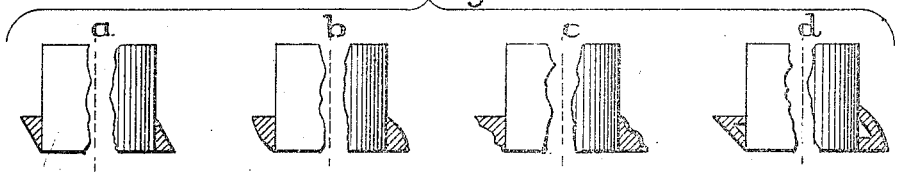

In Figs. 10 are shown true cones, reversed at right and left as above described, 10ª showing a plain cone, 10ᵇ one with its outer face rounded, 10ᶜ having its outer face irregular, and 10ᵈ hollow cones—plain on the left and rounded on the right.

In Figs. 11 are shown how the sustaining ring might extend slightly beyond the corresponding extremity of the joint-ring as at 9ᵇ, although true cones with rounded and flat faces are here illustrated. 11ª shows the sustaining ring cylindrical throughout, 11ᵇ shows it upset as by being compressed radially inward at 91 beyond the extremity of the joint-ring, and 11ᶜ shows it compressed radially inward to a greater extent at 92 so that some of its tapered portion stands within and is surrounded by a reduced extremity of the joint-ring 82 and hence there will be considerable frictional resistance to the movement of the latter along on the sustaining ring toward its extension 9ª. This end of the sustaining ring can be upset or compressed inward in this manner to advantage where both extremities of the meeting members are cut off flat, as the reduced end of the sustaining ring assists the tapered exterior of the joint-ring which always acts to center the gasket as the members are approximated.

In Figs. 12 the corresponding end of the sustaining ring is shown upset by being expanded radially outward, 12ª showing a plain curved expansion as by spinning the sustaining ring at 93, 12ᵇ showing the spinning carried to such an extent as to produce a flange 94, and 12ᶜ showing a bead 95, also illustrated in Fig. 5. These views show some of the different sections of the joint-ring which could well be employed with an outwardly expanded upset end, which latter is probably more useful where the approaching extremity of the adjacent member is flared as best seen in Fig. 6, and the joint-ring could obviously not be dislodged easily from the end of the sustaining ring if upset in this manner.

Other modifications in the shape of the two parts constituting the gasket will suggest themselves to the manufacturer and may be adopted as the demands of the trade indicate, but as above stated I consider it essential that the joint-ring fit frictionally and slidably around the sustaining ring near one end of the latter, while its other end be truly cylindrical exteriorly and fit frictionally and slidably into the bore of one of the members that are to be connected.

In other applications filed by me and bearing Serial Numbers 451,856 and 451,544 I have illustrated and described complete pipe connections embodying practically the same general idea, but differing from the present case in that in the former one of the members has a flared extremity and the joint-ring does not necessarily slide upon the sustaining ring, whereas in the latter both members are cut off flat at their extremities and the parts may slide upon each other. Said applications therefore contain variations in the form of the parts of the complete pipe connection whereby the compression of the joint-ring is respectively longitudinal and radially inward or longitudinal and radially outward, whereas the present invention contains details relating to the gasket itself adapted for use with pipe sections of members having meeting extremities of a variety of shapes and sizes, and intended to fit them all.

What is claimed as new is:

1. As an article of manufacture, a gasket comprising a yielding metallic joint-ring, and a stiff sustaining ring longer than the joint-ring and around which the latter is frictionally but slidably fitted.

2. As an article of manufacture, a gasket comprising a joint-ring of soft metal, and a sustaining ring of stiff metal extending through and beyond one end of the joint-ring and around which the latter is slidably fitted.

3. As an article of manufacture, a gasket comprising a yielding metallic joint-ring having a substantially cylindrical bore, and a stiff sustaining ring longer than the joint-ring and upon which the bore of the latter is frictionally but slidably fitted.

4. As an article of manufacture, a gasket comprising a yielding metallic joint-ring smaller externally at one end than elsewhere, and a sustaining ring extending from the smaller end through the joint-ring and beyond its other end, the joint-ring being slidably fitted on the sustaining ring.

5. As an article of manufacture, a gasket comprising a yielding metallic joint-ring having a substantially conical exterior, and a sustaining ring extending from the smaller end through the joint-ring and beyond its other end, the joint-ring being slidably fitted on the sustaining ring.

6. As an article of manufacture, a gasket comprising a yielding metallic joint-ring having a truly conical exterior, and a sustaining ring extending from a point substantially flush with one end of the joint-ring, throughout its length wherein it fits frictionally but slidably, and beyond its other end.

7. As an article of manufacture, a gasket comprising a yielding joint-ring, and a sustaining ring extending from a point beyond one end of the joint-ring, throughout its body, to a point substantially flush with its other end and there contracted slightly, for the purpose set forth.

8. As an article of manufacture, a gasket comprising a yielding joint-ring, and a sustaining ring extending from a point beyond one end of the joint-ring, throughout its body, to a point substantially flush with its other end and there contracted slightly, the joint-ring being frictionally fitted around the sustaining ring but slidable thereon under pressure, for the purpose set forth.

9. As an article of manufacture, a gasket comprising a yielding joint-ring having a cylindrical bore reduced at one extremity, and a sustaining ring extending from a point beyond the other extremity of the joint-ring, through the latter and contracted within the reduced portion thereof, whereby the joint-ring is frictionally held on the sustaining ring, for the purpose set forth.

In testimony whereof, I have hereunto subscribed my signature, this 22nd day of August, A. D. 1908.

HENRY MUELLER.

Witnesses:
E. BROWN,
JOHN L. WADDELL.